United States Patent [19]
Roustaei

[11] Patent Number: 6,123,261
[45] Date of Patent: Sep. 26, 2000

[54] OPTICAL SCANNER AND IMAGE READER FOR READING IMAGES AND DECODING OPTICAL INFORMATION INCLUDING ONE AND TWO DIMENSIONAL SYMBOLOGIES AT VARIABLE DEPTH OF FIELD

[76] Inventor: Alexander R. Roustaei, 2454 Rue Denise, La Jolla, Calif. 92037

[21] Appl. No.: 09/073,501

[22] Filed: May 5, 1998

Related U.S. Application Data

[60] Provisional application No. 60/045,542, May 5, 1997.

[51] Int. Cl.[7] .................................................. G06K 7/10
[52] U.S. Cl. .................. 235/462.01; 235/462.41
[58] Field of Search ..................... 235/472.01, 462.01, 235/462.25, 462.26, 462.1, 462.24, 462.41

[56] References Cited

U.S. PATENT DOCUMENTS

| | | |
|---|---|---|
| 3,832,646 | 8/1974 | Szabo et al. . |
| 3,962,650 | 6/1976 | Gay . |
| 4,077,014 | 2/1978 | Satoh . |
| 4,146,305 | 3/1979 | Tanaka . |
| 4,157,211 | 6/1979 | Tanaka et al. . |
| 4,169,247 | 9/1979 | Watanabe et al. . |
| 4,292,596 | 9/1981 | Ishizuka et al. . |
| 4,476,439 | 10/1984 | Sato . |
| 4,541,010 | 9/1985 | Alston . |
| 4,603,262 | 7/1986 | Eastman et al. . |
| 4,639,588 | 1/1987 | Shinoda . |
| 4,643,557 | 2/1987 | Ishizaki et al. . |
| 4,647,975 | 3/1987 | Alston et al. . |
| 4,691,253 | 9/1987 | Silver . |
| 4,733,067 | 3/1988 | Oinoue et al. . |
| 4,734,566 | 3/1988 | Senda et al. . |
| 4,762,985 | 8/1988 | Imai et al. . |
| 4,827,348 | 5/1989 | Ernest et al. . |
| 4,841,324 | 6/1989 | Ogasawara . |
| 4,850,009 | 7/1989 | Zook et al. . |
| 4,874,231 | 10/1989 | Aono . |
| 4,888,609 | 12/1989 | Hamada et al. . |
| 4,930,848 | 6/1990 | Knowles . |
| 4,978,850 | 12/1990 | Bayley et al. . |
| 5,010,241 | 4/1991 | Butterworth . |
| 5,070,305 | 12/1991 | Confalonieri et al. . |
| 5,100,220 | 3/1992 | Voegeli . |
| 5,124,537 | 6/1992 | Chandler et al. . |
| 5,150,250 | 9/1992 | Setani . |
| 5,155,343 | 10/1992 | Chandler et al. . |
| 5,168,369 | 12/1992 | Sugiura . |
| 5,172,276 | 12/1992 | Ueyama et al. . |
| 5,175,652 | 12/1992 | Shimizu . |
| 5,182,647 | 1/1993 | Chang . |
| 5,188,983 | 2/1993 | Guckel et al. . |
| 5,202,785 | 4/1993 | Nelson . |
| 5,262,623 | 11/1993 | Batterman et al. . |
| 5,276,315 | 1/1994 | Surka . |
| 5,288,985 | 2/1994 | Chadima, Jr. et al. . |
| 5,291,009 | 3/1994 | Roustaei .................................. 235/472 |
| 5,296,690 | 3/1994 | Chandler et al. . |
| 5,308,966 | 5/1994 | Danielson et al. . |
| 5,321,553 | 6/1994 | Ishiyama et al. . |
| 5,329,105 | 7/1994 | Klancik et al. . |
| 5,331,176 | 7/1994 | Sant' Anselmo et al. . |
| 5,343,028 | 8/1994 | Figarella et al. . |
| 5,349,172 | 9/1994 | Roustaei .................................. 235/472 |
| 5,351,314 | 9/1994 | Vaezi . |
| 5,354,977 | 10/1994 | Roustaei .................................. 235/472 |
| 5,378,881 | 1/1995 | Adachi . |
| 5,378,883 | 1/1995 | Batterman et al. . |
| 5,387,786 | 2/1995 | Peng . |

(List continued on next page.)

OTHER PUBLICATIONS

Celniker and Gossard, *Computer Graphics,* vol. 25, No. 4, "Deformable Curve and Surface Finite–Elements for Free–Form Shape Design", Jul. 1991, pp. 257–266.

*Primary Examiner*—Thien M. Le
*Attorney, Agent, or Firm*—Baker & McKenzie

[57] ABSTRACT

An integrated system and method for reading image data. An optical scanner/image reader is provided for reading images and decoding optical information or code, including one and two dimensional symbologies at variable depth of field, including memory and image processing for high speed applications.

84 Claims, 11 Drawing Sheets

U.S. PATENT DOCUMENTS

| | | |
|---|---|---|
| 5,398,064 | 3/1995 | Saka . |
| 5,408,084 | 4/1995 | Brandorff et al. . |
| 5,410,141 | 4/1995 | Koenck et al. . |
| 5,414,251 | 5/1995 | Durbin . |
| 5,418,862 | 5/1995 | Zheng et al. . |
| 5,422,670 | 6/1995 | Fukui . |
| 5,428,211 | 6/1995 | Zheng et al. . |
| 5,438,188 | 8/1995 | Surka . |
| 5,468,945 | 11/1995 | Huggett et al. . |
| 5,473,149 | 12/1995 | Miwa et al. . |
| 5,475,768 | 12/1995 | Diep et al. . |
| 5,484,994 | 1/1996 | Roustaei ................................. 235/462 |
| 5,489,769 | 2/1996 | Kubo . |
| 5,491,346 | 2/1996 | Sussmeier . |
| 5,496,992 | 3/1996 | Madan et al. . |
| 5,502,485 | 3/1996 | Suzuki . |
| 5,504,367 | 4/1996 | Arackellian et al. . |
| 5,512,739 | 4/1996 | Chandler et al. . |
| 5,525,787 | 6/1996 | Kubo . |
| 5,532,467 | 7/1996 | Roustaei . |
| 5,545,887 | 8/1996 | Smith et al. . |
| 5,550,365 | 8/1996 | Klancnik et al. . |
| 5,550,366 | 8/1996 | Roustaei . |
| 5,561,458 | 10/1996 | Cronin et al. . |
| 5,572,006 | 11/1996 | Wang et al. . |
| 5,581,071 | 12/1996 | Chen et al. . |
| 5,585,616 | 12/1996 | Roxby et al. . |
| 5,597,997 | 1/1997 | Obata et al. . |
| 5,602,379 | 2/1997 | Uchimura et al. . |
| 5,625,483 | 4/1997 | Swartz . |
| 5,627,358 | 5/1997 | Roustaei . |
| 5,756,981 | 5/1998 | Roustaei et al. ........................ 235/462 |
| 5,777,314 | 7/1998 | Roustaei . |
| 5,786,582 | 7/1998 | Roustaei et al. ........................ 235/462 |

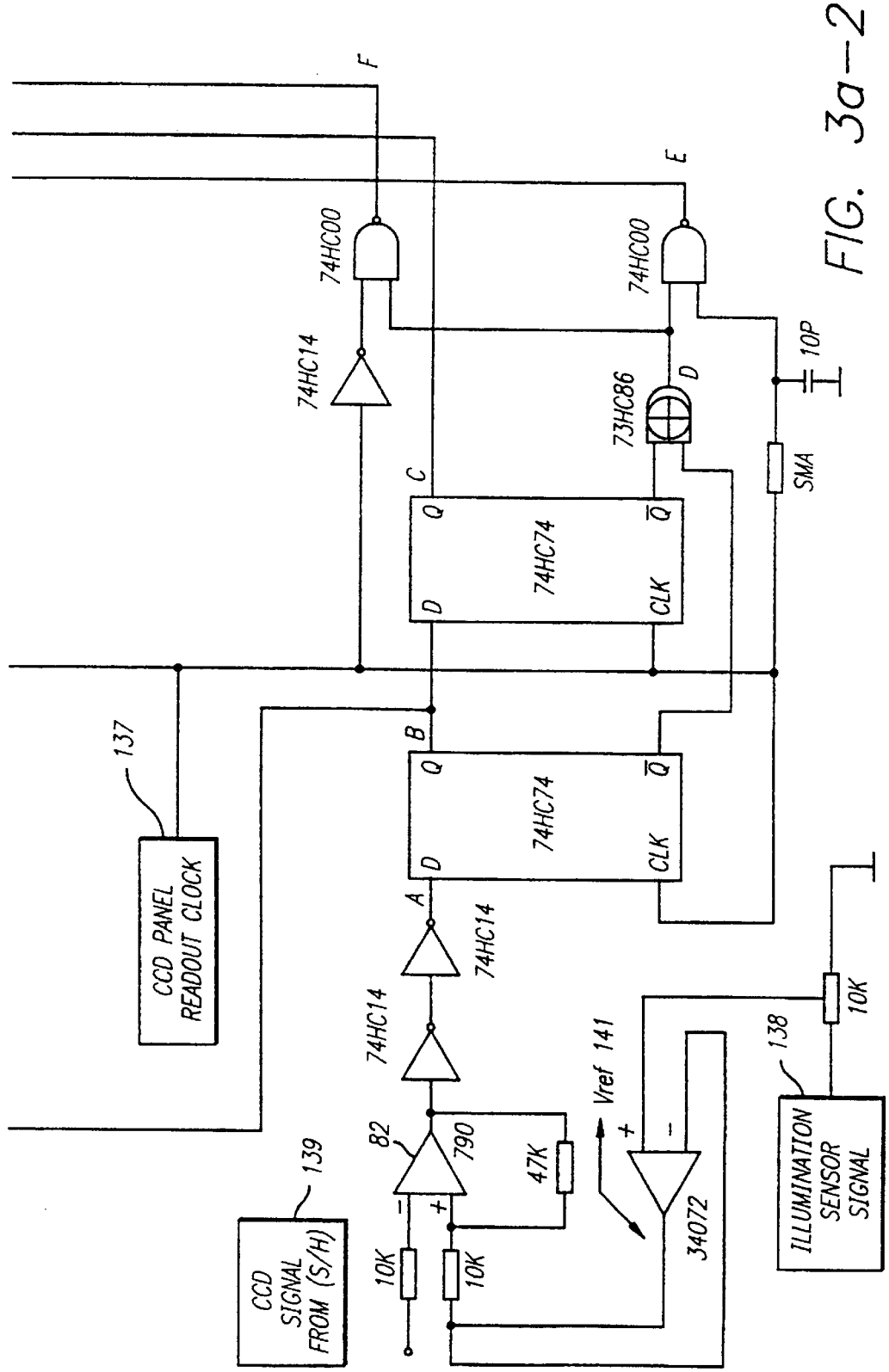

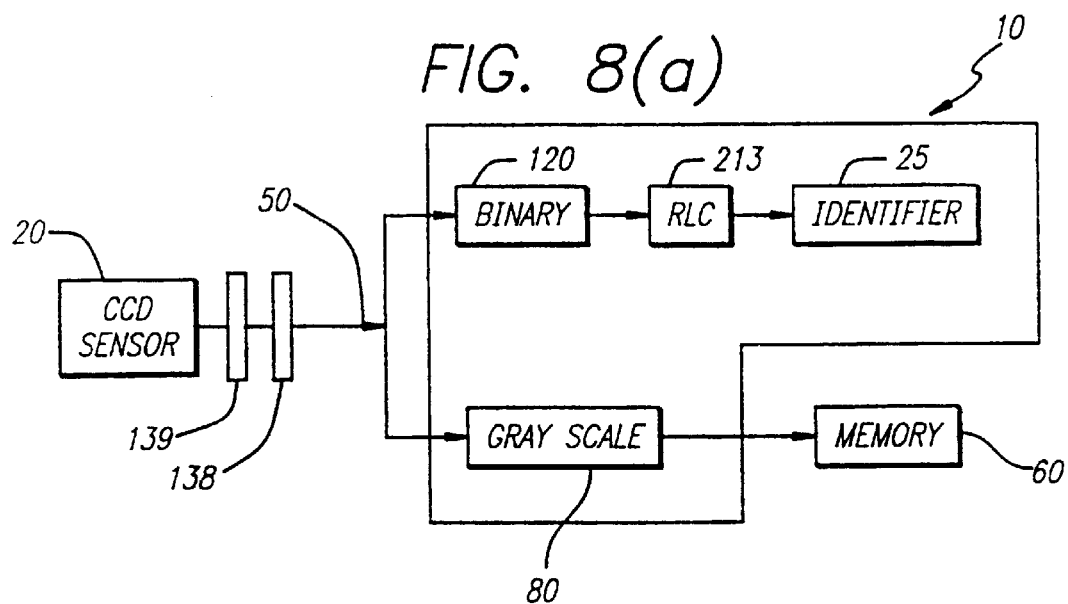
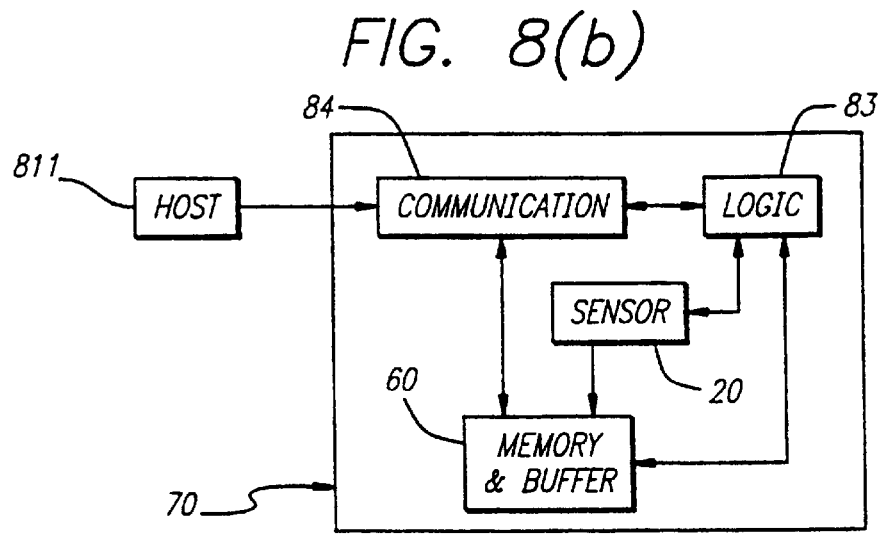
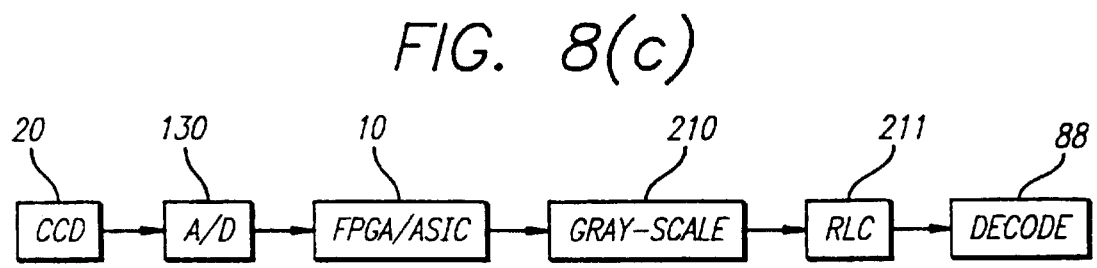

OPTICAL SCANNER AND IMAGE READER FOR READING IMAGES AND DECODING OPTICAL INFORMATION INCLUDING ONE AND TWO DIMENSIONAL SYMBOLOGIES AT VARIABLE DEPTH OF FIELD

Priority is claimed from Provisional Application Ser. No. 60/045,542, filed May 5, 1997, entitled, "Optical Scanner/Image Reader for Reading Images and Decoding Optical Information or Code, Including One and Two Dimensional Symbologies at Variable Depth of field, Including Memory and Image Processing for High Speed Applications".

FIELD OF THE INVENTION

This invention generally relates to a scanning or imaging system for reading and/or analyzing optically encoded information or images and more particularly to a system "on-chip" with intelligence for grabbing, analyzing and/or processing images within a frame.

BACKGROUND OF THE INVENTION

Many industries, including the assembly processing, grocery and food processing industries, transportation, and multimedia industries, utilize an identification system in which the products are marked with an optical code (such as a bar code symbol consisting of a series of lines and spaces of varying widths, or other type of symbols consisting of series of contrasting markings, generally known as two dimensional symbology). A number of different optical code readers and laser scanning systems have been developed to decode the optical pattern to a multiple digit representation for inventory, production tracking, check out or sales. Some of optical reading devices are also used to take pictures and display, store or transmit real time images to another system.

Optical readers or scanners are available in a variety of configurations, some of which are built into a fixed scanning station and others of which are portable. The portability of an optical reading device provides a number of advantages, including the ability to inventory products on shelves and to track portable items such as files or small equipment. A number of these portable reading devices incorporate laser diodes which permit the user to scan the symbology at variable distances from the surface on which the optical code is imprinted. A disadvantage of known laser scanners is that they are expensive to manufacture and do not provide the ability to reproduce the image of the targeted area by the sensor and therefore limits the field of use of optical code reading devices. Additionally laser scanners typically require a raster scanning technique to read and decode a two dimensional optical code.

Another type of optical code reading device, generally known as scanner or imager, which can be incorporated into a portable system uses light emitting diodes (LEDs) as a light source and charge coupled devices (CCD) or Complementary metal oxide silicon (CMOS) sensors as detectors. This class of scanners or imagers is generally known as "CCD scanners" or "CCD imagers". CCD scanners take a picture of the optical code and stores the image in a frame memory, which is then scanned electronically, or processed using software to convert the captured image into an output signal.

One type of such CCD scanner is disclosed in earlier patents of the present inventor, Alexander Roustaei. These patents include U.S. Pat. Nos. 5,291,009, 5,349,172, 5,354,977, 5,532,467, and 5,627,358. While CCD scanners have the advantage of being less expensive to manufacture, the scanners prior to Roustaei were limited to scanning the optical code by either contacting the surface on which the optical code is imprinted or maintaining a distance of no more than one and one-half inches away from the optical code, which creates a further limitation in that it cannot read optical code any bigger than the window or housing width of the reading device. The CCD scanner disclosed in U.S. Pat. No. 5,291,009 and its offspring introduced the ability to read symbologies which are wider than the physical width and height of the scanner housing at distances as much as twenty inches from the scanner or imager. This added versatility to CCD scanners which previously were limited to contact and close range, now allowing the CCD scan engines or imagers to be incorporated in fixed scanner systems, such as are used at retail checkout counters.

Considerable attention has been directed toward the scanning of two-dimensional symbologies, which can store about 100 times more information in the same space occupied by a one-dimensional symbology. In two-dimensional symbologies, rows of lines and spaces are either stacked upon each other or they form matrix of black and white square, rectangular or hexagon cells. The symbologies or the optical codes are read by scanning a laser across each row, in the case of stacked symbology, in succession in a zig-zag pattern. A disadvantage of this technique is that it introduces the risk of loss of vertical synchrony due to the time required to scan the entire optical code. It also has the disadvantage of requiring a laser for illumination and moving part for generating the zig-zag pattern, in order to scan the entire symbology, which makes the scanner more expensive and less reliable due to mechanical parts.

In all types of optical codes, i.e., one-dimensional, two-dimensional and even three- dimensional (multi-color superimposed symbologies), the performance of the optical system needs to be optimized to provide the best possible resolution, signal-to-noise ratio, contrast and response. These and other parameters are controllable by selection of, and adjustments to, the optical components, e.g., lens system, the wavelength of illuminating light, the optical and electronic filtering, and the detector sensitivity.

A further disadvantage of scanning two-dimensional symbologies is that it takes an increased amount of time and image processing power to capture the image and process it, i.e., increased microcomputer memory and faster duty-cycle processor.

Another disadvantage of known apparatus for scanning symbologies is that the high-speed processing chips they require are costly, generate heat and occupy space.

Accordingly, there is a need for, and it is an object of the invention to provide a system for scanning symbologies that integrates the necessary components onto a single chip or a reduced number of chips. It is also an object of the present invention to reduce the amount of on-board memory and to provide a system requiring a reduced amount of power and having a lower level of heat generation.

A further object of the invention is to provide a scanning or imaging device employing a high quality and high speed image processing system, including image grabbing, image processing and decoding functions, of the target symbology or optical code.

Another object of the invention is to provide scanners or imagers having variable depth of field with means for aiding an operator in framing symbology, i.e., targeted area, so that is captured in the appropriate field of view.

A further object of the invention is to provide an imaging device able to scan a plurality of symbologies within one optically scanned image field, and then separate or segment the image field into individual symbology fields at high speed.

SUMMARY OF THE INVENTION

These and other objects and advantages are achieved in the present invention by providing a preferably integrated system for scanning target images and processing them, preferably in real time commencing during the scanning process. In one embodiment, an optical scanning head is provided that includes one or more light emitting diodes (LEDs) mounted on each side of a printed circuit board to emit light at different angles. A diverging beam of light is created.

A progressive scanning CCD is provided in which data can be read one line after another and dumped into the memory or register, providing simultaneously Binary and Gray-Scale data. Simultaneously, the image processing apparatus preferably identifies the area of interest and the type and nature of the optical code or information existing within the frame.

In one embodiment, the present invention provides an optical reading device for reading optical codes and one or more, one- or two- dimensional symbologies contained within a target image field having a first width, wherein said optical reading device includes at least one printed circuit board having a front edge with a second width, illumination means (using a coherent or incoherent light, in visible or invisible spectrum) for projecting an incident beam of light onto said target image field and said optical reading device further including an optical assembly comprising a plurality of lenses disposed along an optical path for focusing reflected light at a focal plane, said optical reading device further including sensor means within said optical path, said sensor mean including a plurality of pixel elements for sensing illumination level of said focused light, and said optical reading device further including processing means for processing said sensed target image to obtain an electrical signal proportional to said illumination levels and output means for converting said electrical signal into output data, said output data describing a gray scale illumination level for each pixel element that is directly relatable to discrete points within said target image field, and said processing means having a communication means for communicating with a host computer or another unit designated to use the data collected and or processed by the optical reading device, a combination comprising memory means in communication with the processor; machine-executed means coupled with the memory, processor and glue logic for controlling said optical reading device and processing the targeted image onto sensor to provide decoded data, raw, stored or life image, representing the optical image targeted onto the sensor.

The present invention provides an optical scanner or imager for reading not only the optically encoded information or symbols but also the ability to take pictures to be stored in the memory of the device or to be transmitted via a communication means to another receiving unit.

In accordance with the present invention, individual fields are decoded and digitally scanned back onto the image field. This increases throughput speed of reading symbologies. An example where fast throughput is required is that of processing moving packages with symbologies containing information being attached or imprinted thereon called high speed sortation which can be at a speed of 200 feet or higher, per minute.

Another advantage of the present invention is that the image containing information can be located at variable distances from the reading device using LED light source, ambient or flash light in conjunction with specialized smart sensors which has on-chip signal processing means to provide raw picture or decoded information contained in a frame having the a real time image processing capability.

Another advantage of the present invention is to provide an optical reading device which can capture in a single snap shot and decode one- and/or two-dimensional symbols, optical codes and images.

Another advantage of the present invention is to provide an optical reading device to decode optical codes having a wide range of feature sizes.

Another advantage of the present invention is to provide an optical reading device which can read optical codes omnidirectionally.

Another advantage of the present invention is providing all of the above advantages in an optical reading device, and including a microcomputer and image processing software in an ASIC or FPGA.

Another advantage of the present invention is providing all of the above advantages in an optical reading device, and including a microcomputer which include microprocessor, memory and memory buffer, ADC, and image processing software in an ASIC or FPGA, all on the same chip.

Another advantage of the present invention is providing all of the above advantages in an optical reading device, while efficiently using the microcomputer's memory and other integrated sub-system, without burdening its central processing unit while efficiently conserving power.

Another advantage of the present invention is providing all of the above advantages in an optical reading device, while increasing processing speed and image processing quality and while providing the ability to segment a plurality of images from the same image field for high throughput speed.

Another advantage of the present invention is providing all of the above advantages in an optical reading device, in a form of engine or finished product while most or all of the electronic functions are integrated in the same piece of silicon.

These and other features and advantages of the present invention will be appreciated from review of the following detailed description of the invention, along with the accompanying figures in which like reference numerals refer to like parts throughout.

BRIEF DESCRIPTION OF THE DRAWINGS

FIG. 1(*b*) illustrates a target to be scanned in accordance with the present invention;

FIG. 1(*c*) illustrates image data corresponding to the target, in accordance with the present invention;

FIG. 2(*b*) illustrates an example of a floating threshold curve used in an embodiment of the present invention;

FIG. 2(*c*) illustrates an example of vertical and horizontal line threshold values, such as used in conjunction with mapping a floating threshold curve surface, as illustrated in FIG. 2(*b*) an embodiment in accordance with the present invention;

FIG. 8(a) is a diagram illustrating an apparatus in accordance with the present invention;

FIG. 8(b) illustrates an embodiment of the present invention showing a system on a chip in accordance with the present invention;

FIG. 8(c) illustrates a flow diagram in accordance with the present invention;

DETAILED DESCRIPTION OF THE INVENTION

Referring to the figures, the present invention provides an optical scanner or imager 15 for reading optically encoded information and symbols, which also has a picture taking feature and picture storage memory 21 for storing the pictures. In this description, "optical scanner", "imager" and "reading device" will be used interchangeably for the integrated scanner on a single chip technology described in this description.

Figure 8F:
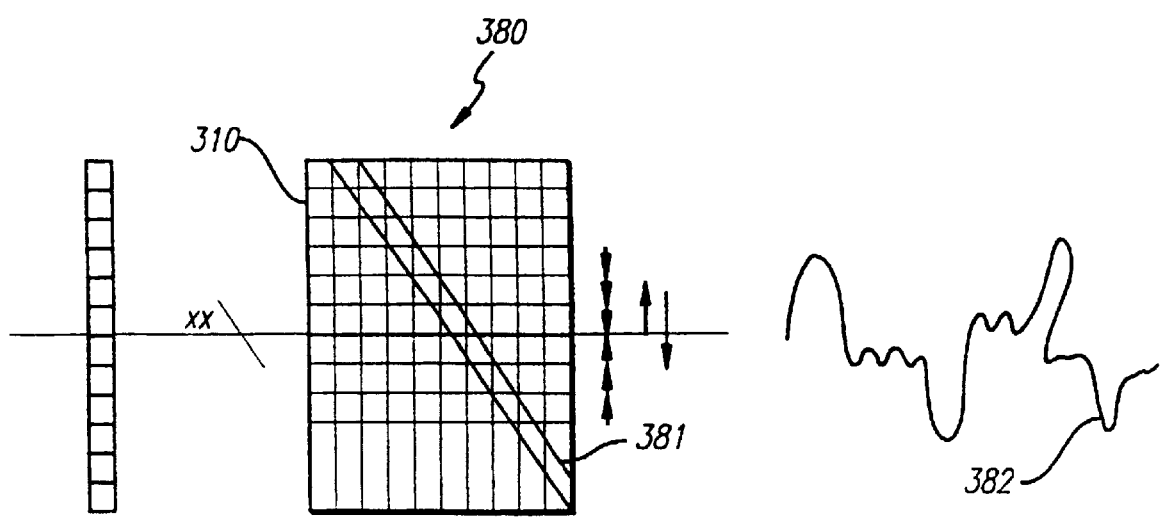
FIG. 8(f) illustrates pixel projection with respect to the scan line in accordance with the present invention.

The optical scanner or imager 15 of the present invention preferably includes a transmission system for conveying images via a communication interface as shown in FIG. 8(b) to another receiving unit, such as a host computer 811. The communications interface 84 may provide for any form of transmission of data, such as such as cabling, infra-red transmitter/receiver, RF transmitter/receiver or any other wired or wireless transmission system.

Figure 1A:
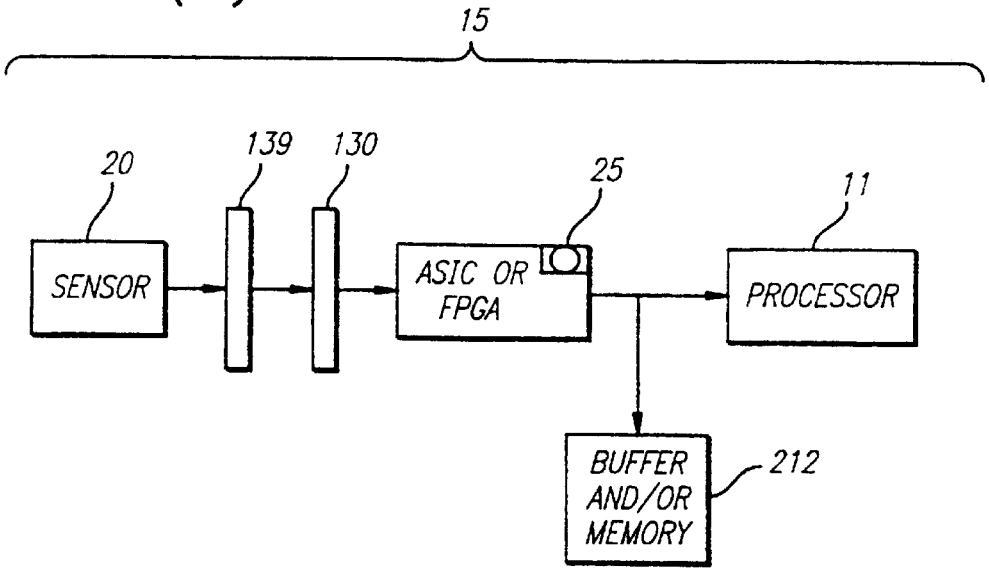
FIG. 1(*a*) is a diagram illustrating an embodiment in accordance with the present invention.
Figure 1B:
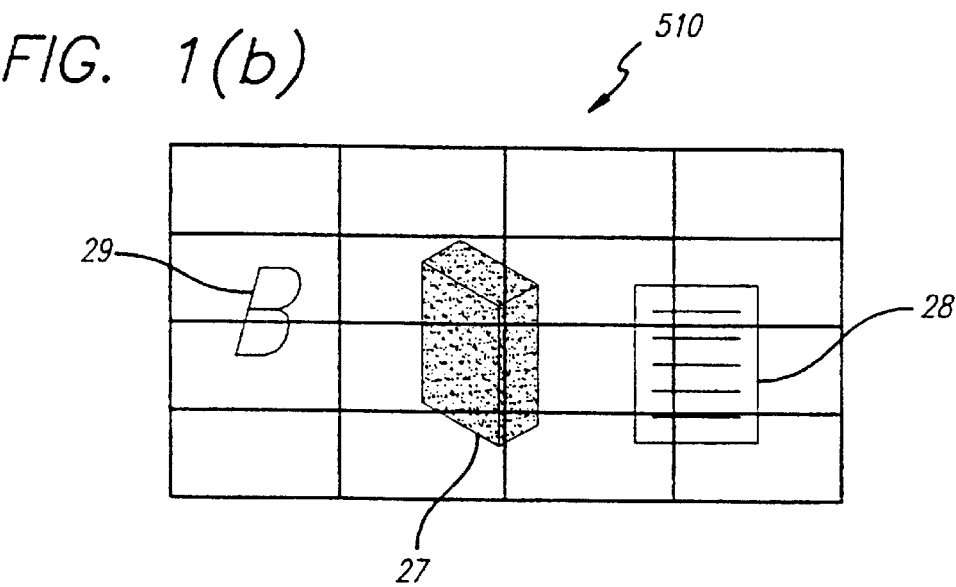
Figure 1C:
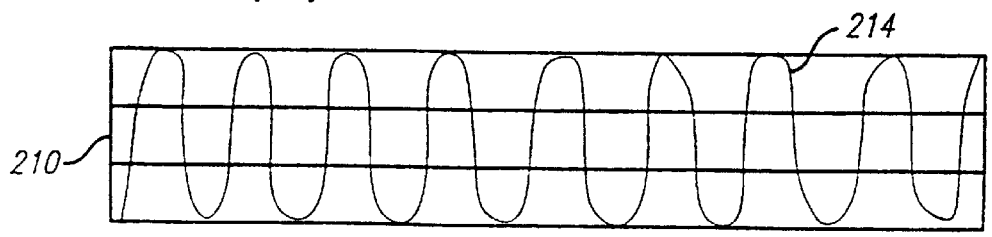

FIG. 1(b) illustrates a target 510 to be scanned in accordance with the present invention. The target includes, including a one-dimensional image 28, two-dimensional image 27 and text 29. These are examples of the type of information to be scanned. FIG. 1(c) also illustrates an image or frame 210, which represents digital data corresponding to the scanned target 510. As shown in FIG. 1(c), the image or frame, preferably includes data corresponding to a plurality of screen pixels 214, although it should be understood that any form of data corresponding to scanned target 510 may be used. It should also be understood that in this application, the terms "image" and "frame" are used to indicate a region being scanned.

In operation, the target 510 can be located at any distance from the optical reading device 15, so long as it is with in the depth of field of the imaging device 15. Any form of light source providing sufficient illumination may be used. For example, an LED light source 72, ambient light or strobe light 720 may be used. As shown in FIG. 8(b), these may be used in conjunction with specialized smart sensors 20, which has on-chip sensor 20 and signal processing means to provide raw picture or decoded information corresponding to the information contained in a frame or image 210 to the host computer 811. The optical scanner 15 preferably has real time image processing technique capabilities, using one or a combination of the methods and apparatus discussed in more detail below, providing improved scanning abilities.

Hardware Image Processing

Various forms of hardware-based image processing may be used in the present invention. One such form of hardware-based image processing utilizes active pixel sensors, as described in U.S. patent application no. 08/690,752, issued as U.S. Pat. No. 5,756,981 on May 26, 1998. Another form of hardware-based image processing is a Charge Modulation Device (CMD) in accordance with the present invention. A preferred CMD provides at least two modes of operation, including a skip access mode and/or a block access mode for utilization in real-time framing and focusing with an optical scanner 15. It should be understood that in this embodiment, the optical scanner 15 is serving as a digital imaging device or a digital camera. These modes of operation become specifically handy when the sensor 20 is employed in systems that read optical information (including one and two dimensional symbologies) or process images i.e., inspecting products from the captured images as such uses typically require a wide field of view and the ability to make precise observations of specific areas. Preferably, the CMD sensor 20 packs a large pixel count (more than 600×500) and provides three scanning modes, including full-readout mode, block-access mode, and skip-access mode. The full-readout mode delivers high-resolution images from the sensor 20 in a single readout cycle. The block-access mode provides a readout of any arbitrary window of interest facilitating the search of the area of interest (a very important feature in fast image processing techniques). The skip-access mode reads every "n/th" pixel in horizontal and vertical directions. Both block and skip access modes allow for real-time image processing and monitoring of partial and a whole image. Electronic zooming and panning features with moderate and reasonable resolution, also are feasible with the CMD sensors without requiring any mechanical parts.

FIG. 1(a) illustrates a system having an glue logic chip or programmable gate array 10, which also will be referred to as ASIC 10 or FPGA 10. The ASIC or FPGA 10 preferably includes image processing software stored in a permanent memory therein. For example the ASIC or FPGA 10 preferably includes a buffer 212 or other type of memory and/or a working RAM memory providing memory storage. A relatively small size (such as around 40 K) memory can be used, although any size can be used as well. As a target 510 is read by sensor 20, image data 210 corresponding to the target 510 is preferably output in real time by the sensor. The read out data preferably indicates portions of the image 210, which may contain useful data distinguishing between, for example, one dimensional symbologies (sequences of bars and spaces), text (uniform shape and clean gray), and noise (depending to other specified feature i.e., abrupt transition or other special features). Preferably as soon as the sensor 20 read of the image data is completed, or shortly thereafter, the ASIC 10 outputs indicator data 25. The indicator data 25 includes data indicating the type of optical code (for example one or two dimensional symbology) and other data indicating the location of the symbology within the image frame data 210. As a portion of the data is read (preferably around 20 to 30%, although other proportions may be selected as well) the ASIC 10 (software logic implemented in the hardware) can start a gray scale image processing in parallel with the sensor 20 data transfer (called "Real Time Image Processing"). This can happen either at some point during data transfer from sensor 20, or afterwards. This process is described in more detail below in the Gray Scale Image Processing section of this description.

During image processing, or as data is read out from the sensor 20, the ASIC 10, which preferably has the image processing software encoded within its hardware memory, scans the data for special features of any symbology or the optical code that an image grabber is supposed to read through the set-up parameters (For instance if a number of Bars and Spaces together are observed, it will determine that the symbology present in the frame 210 may be a one dimensional or a PDF symbology or if it sees organized and consistent shape/pattern it can easily identify that the current reading is text). Before the data transfer from the CCD 20 is completed the ASIC 10 preferably has identified the type of the symbology or the optical code within the image data 210 and its exact position and can call the appropriate decoding routine for the decode of the optical code. This method increases considerably the response time of the optical scanner 15. In addition, the ASIC 10 (or processor 11) preferably also compresses the image data output from the sensor 20. This data may be stored as an image file or databank, such as in memory 212, or alternatively in on-board memory within the ASIC 10. The databank may be stored at a memory location indicated diagrammatically in FIG. 2(*a*) with box 30. The databank preferably is a compressed representation of the image data 210, having a smaller size than the image 210. In one example, the databank is 5–20 times smaller than the corresponding image data 210. The databank is used by the image processing software to locate the area of interest in the image without analyzing the image data 210 pixel by pixel or bit by bit. The databank preferably is generated as data is read from the sensor 20. As soon as the last pixel is read out from the sensor (or shortly therafter), the databank is also completed. By using the databank, the image processing software can readily identify the type of optical information represented by the image data 210 and then it may call for the appropriate portion of the processing software to operate, such as an appropriate subroutine. In one embodiment, the image processing software includes separate subroutines or objects associated with processing text, one-dimensional symbologies and two-dimensional symbologies, respectively.

In a preferred embodiment of the invention, the imager is a hand-held device. A trigger (not shown) is depressible to activate the imaging apparatus to scan the target 510 and commence the processing described herein. Once the trigger is activated, the illumination apparatus 72 and/or 720 is optionally is activated illuminating the image 210. Sensor 20 reads in the target 510 and outputs corresponding data to ASIC or FPGA 10. The image 210, and the indicator data 25 provide information relative to the image content, type, location and other useful information for the image processing to decide on the steps to be taken. Alternatively, the compressed image data may be used to also or alternatively provide such information. In one example if the image content is a DataMatrix® two-dimensional symbology, the identifier will be positioned so that the image processing software understand that the decode software to be used in this case is a DataMatrix® decoding module and that the symbology is located at a location, reference by X and Y. After the decode software is called, the decoded data is outputted through communication interface 84 to the host computer 811.

In one example, for a CCD readout time of approximately 30 mS for a 500×700 pixels CCD (approximately)) the total Image Processing time to identify and locate the optical code would be around 33 mS, meaning that almost instantly after the CCD readout the appropriate decoding software routine could be called to decode the optical code in the frame. The measured decode time for different symbology depend on their decoding routines and decode structures. In another example, experimentation indicated that it would take about 5 mS for a one-dimensional symbology and between 20 to 80 mS for a two dimensional symbology depending on their decode software complexity.

Figure 8D:
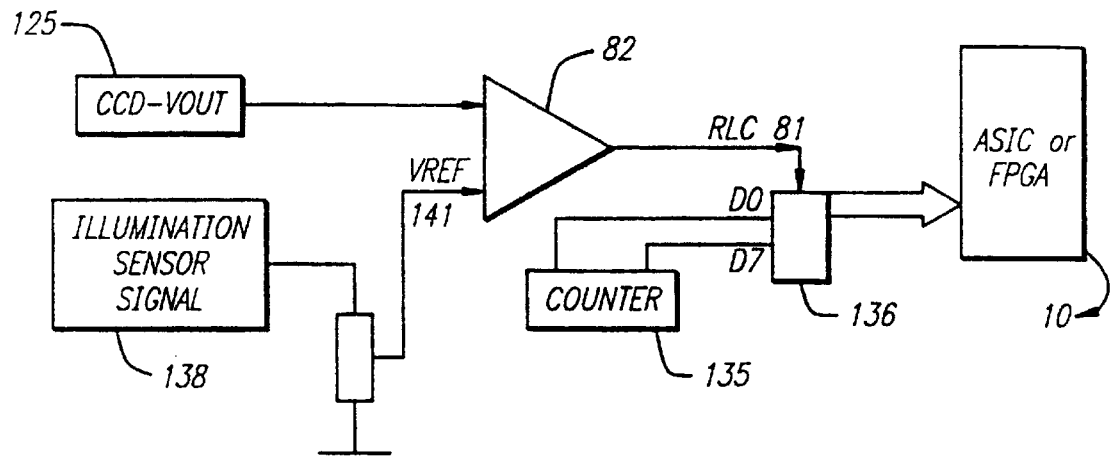
FIG. 8(d) is a block diagram illustrating an embodiment in accordance with the present invention.
Figure 8E:
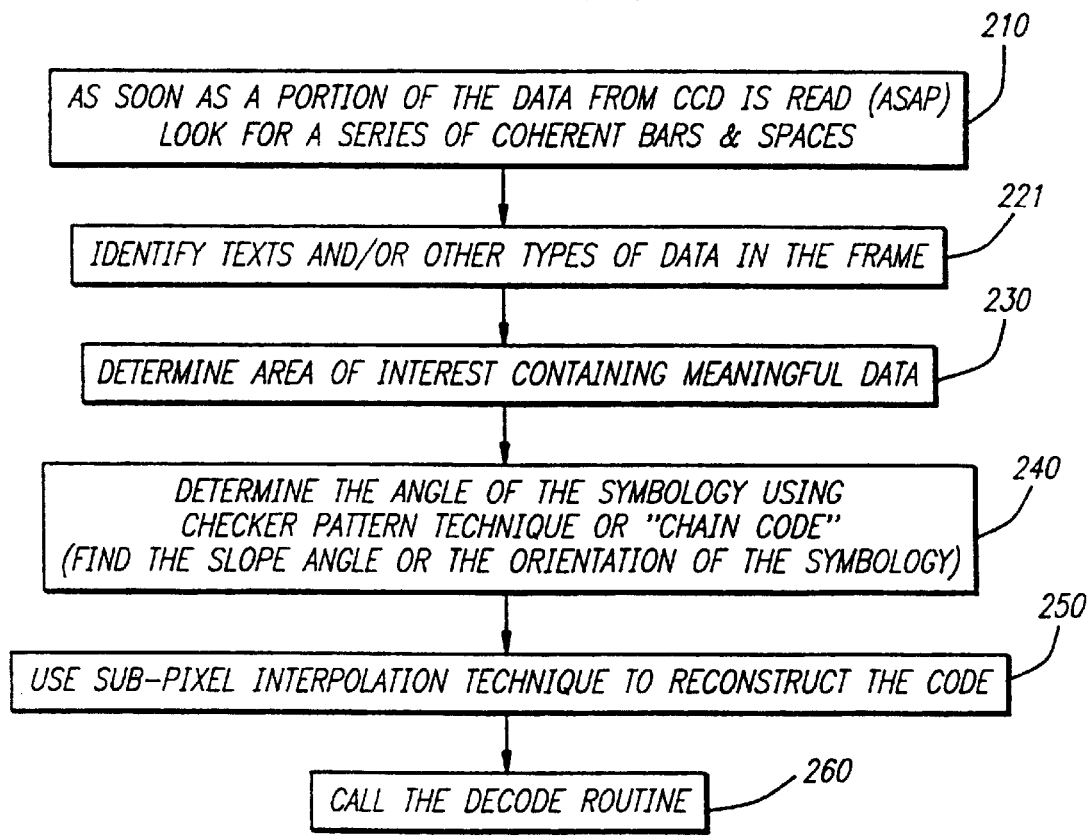
FIG. 8(e) is a block diagram illustrating some of the steps in a gray scale image processing technique in accordance with the present invention.

FIG. 8(*a*) shows a flow chart illustrating processing steps in accordance with these techniques. As illustrated in FIG. 8(*a*), data from the CCD sensor 20 preferably goes to SH (sample and hold) circuit 139 and ADC (analog to digital converter) circuit 130 and then to the ASIC 10, in parallel to its components the gray scale processor 80 and the series of binary processor 120 and run length code processor 213. The RLC processor 213 generates indicator data 25, which either is stored in ASIC 10 (as shown), or can be copied into memory 60 for storage and future use. The gray scale processor 80 outputs pertinent gray scale image data 210 to a memory 60, such as an SDRAM.

Another system for high integration, is illustrated in FIG. 8(*b*). This preferred system can include the CCD sensor 20, a logic processing unit 83 (which performs functions performed by SH 139, ADC 130, and ASIC 10), memory 60, communication interface 84, all preferably integrated in a single computer chip 70, which I call a System On A Chip (SOC) 70. This system reads data directly from the sensor 20. In one embodiment, the sensor 20 is integrated on chip 70, as long as the sensing technology used is compatible with inclusion on a chip, such as a CMOS sensor. Alternatively, it is separate from the chip if the sensing technology is not capable of inclusion on a chip. The data from the sensor is preferably processed in real time using logic processing unit 83, without being written into the memory 60 first, although in an alternative embodiment a portion of the data from sensor 20 is written into memory 60 before processing in logic 83. The ASIC 10 optionally can execute image processing software code. Any sensor 20 may be used, such as CCD, CMD or CMOS sensor 20. The memory 60 may be any form of memory suitable for integration in a chip, such as data Memory and/or buffer memory. In operating this system, data is read directly from the sensor 20, which increases considerably the processing speed. After all data is transferred to the memory 60, the software can work to extract data from both Gray scale image data 210 and Run Length Code (RLC) in RLC memory 211, in one embodiment using the databank data 30 and indicator data 25, before calling the decode software 88, as described 8(*c*)), which are referred to and incorporated herein by this reference; these include: application Ser. No. 08/690,752 filed Aug. 1, 1996, application Ser. No. 08/569,728 filed Dec. 8, 1995, application Ser. No. 08/363,985, filed Dec. 27, 1994, application Ser. No. 08/059,322, filed May 7, 1993, application Ser. No. 07/965,991, filed Oct. 23, 1992, now issued as U.S. Pat. No. 5,354,977, application Ser. No. 07/956,646, filed Oct. 2, 1992, now issued as U.S. Pat. No. 5,349,172, application Ser. No. 08/410,509, filed Mar. 24, 1995, U.S. Pat. No. 5,291,009, application Ser. No. 08/137,426, filed Oct. 18, 1993, application Ser. No. 08/444,387, filed May 19, 1995, and application Ser. No. 08/329,257, filed Oct. 26, 1994. One difference between these patents and applications and the present invention is that the image processing of the present invention does not use the binary data exclusively. Instead, the present invention also considers data extracted from the "double taper" and data bank 30 to locate the area of interests and also it uses the gray scale to enhance the decodability of the symbol found in the frame as shown in FIG. 8(c) (particularly for one dimensional and stacked symbology) using the sub-pixel interpolation technique as described in the image processing section).

Figure 2A:
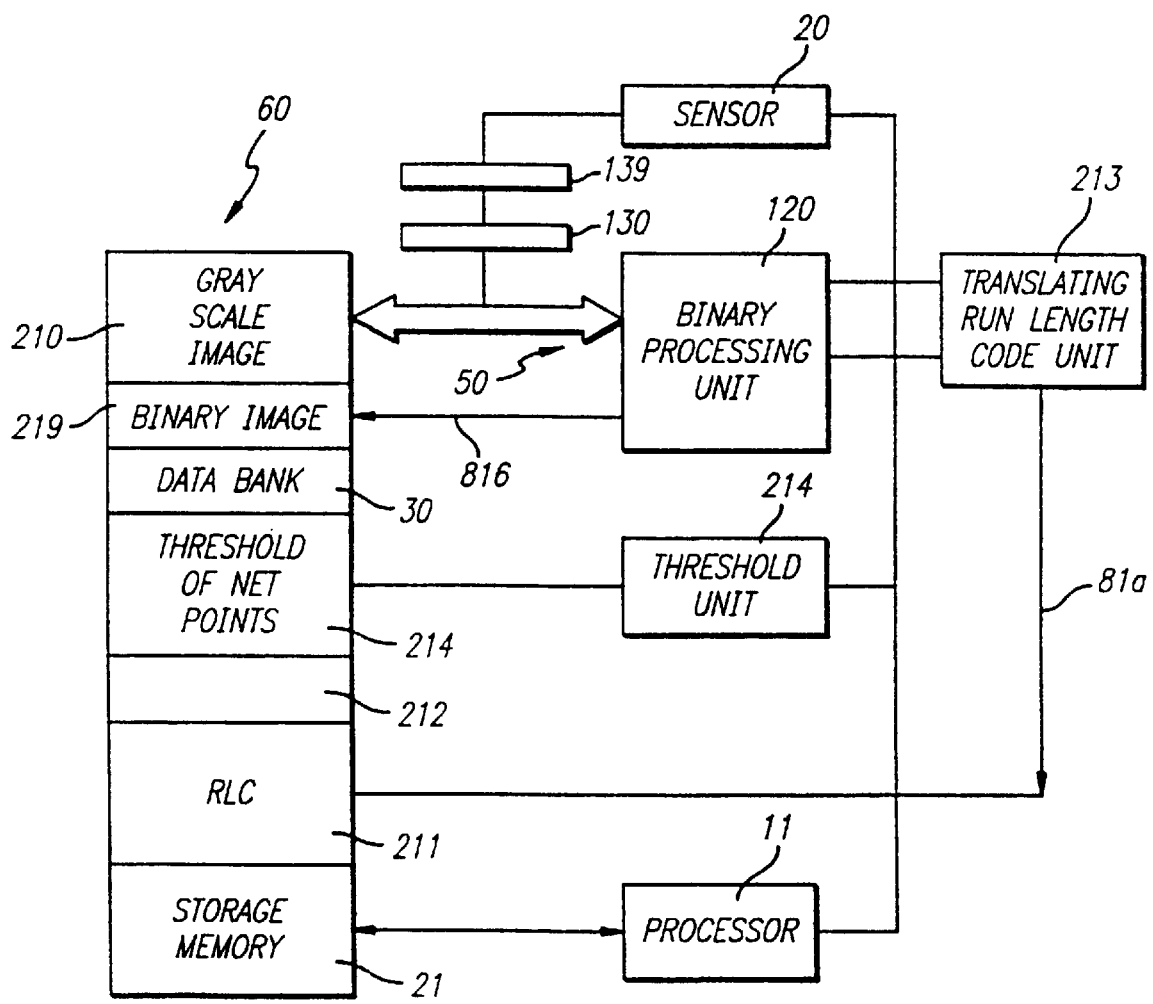
FIG. 2(*a*) is a diagram of an embodiment in accordance with the present invention.
Figures 1, 3A:
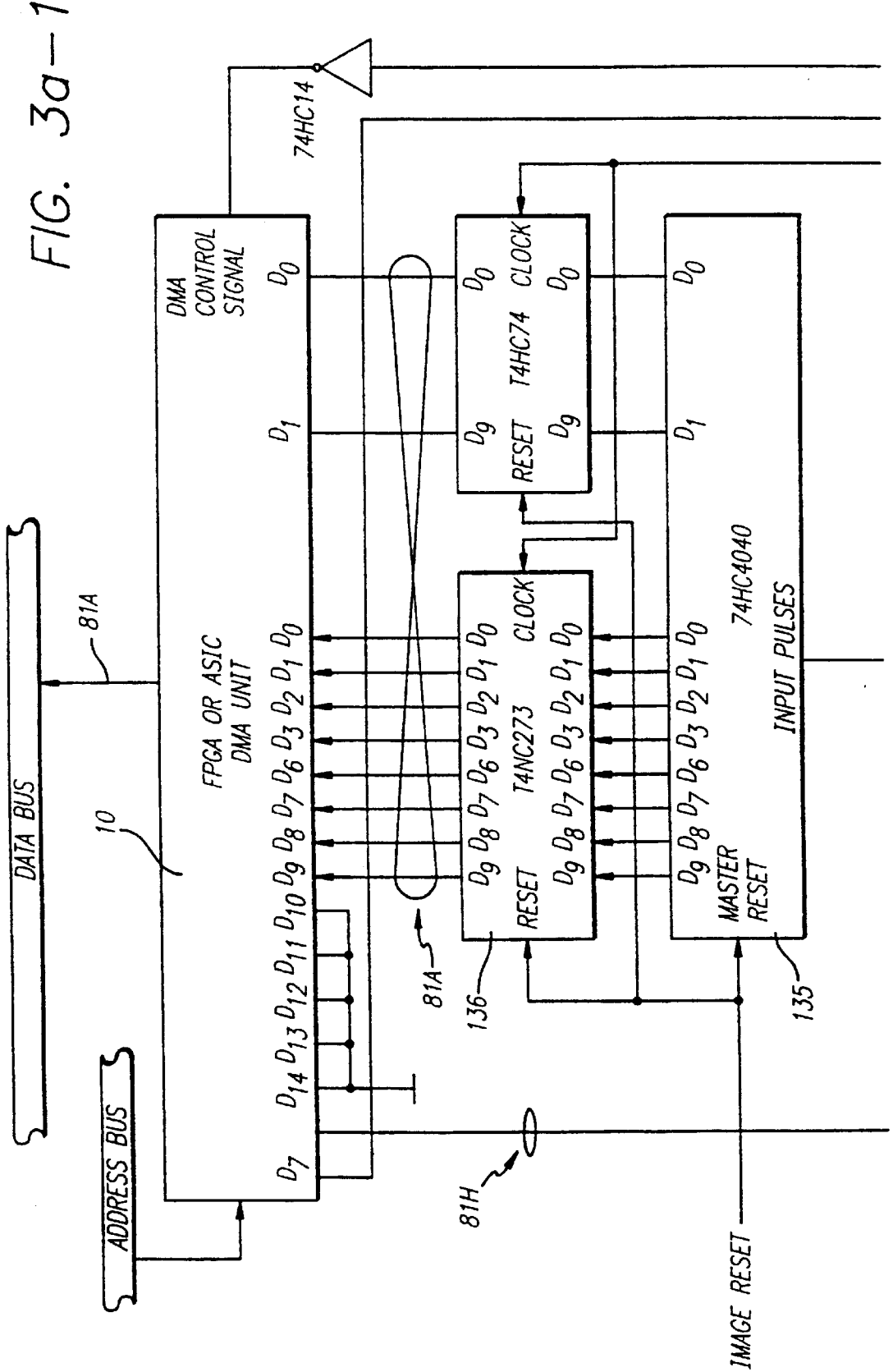
FIG. 3(a) is a diagram of an apparatus in accordance with the present invention.
Figure 3B:
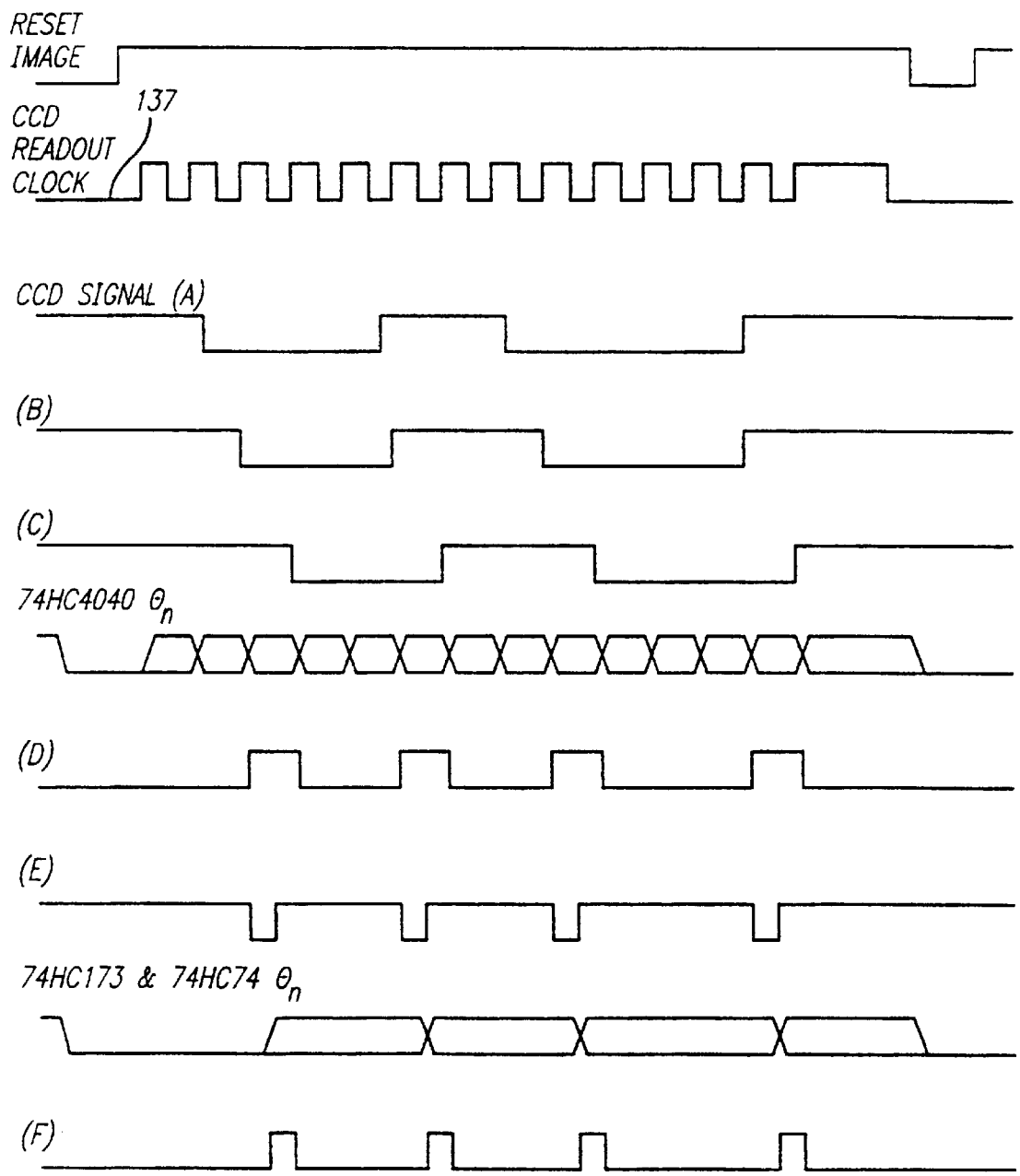
FIG. 3(b) illustrates clock signals as used in an embodiment of the present invention.

FIGS. 2(a) and 3(a) illustrate one embodiment of a hardware implementation of a binary processing unit 120 and a translating RLC unit 213. It is noted that the binary processing unit 120, may be integrated on a single unit, as in SOC 70, or may be constructed of a greater number of components. FIG. 3(a) provides an exemplary circuit diagram of binary processing unit 120 and a translating RLC unit 213. FIG. 3(b) illustrates a clock timing diagram corresponding to FIG. 3(a).

The binary processing unit 120 receives data from sensor (i.e. CCD) 20. With reference to FIG. 8(d), an analog signal from the sensor 20 (Vout 125) is provided to a sample and hold circuit 139. A Schmitt Comparator is provided in an alternative embodiment to provide the RLC (run length code) at the DMA (direct memory access) sequence into the memory as shown in FIG. 8(d). In operation, the counter 135 transfers numbers, representing X number of pixels of 0 or 1 at the DMA sequence instead of "0" or "1" for each pixel, into the memory 60 (which in one embodiment is a part of FPGA or ASIC 10). The Threshold 214 and RLC 213 functions preferably are conducted in real time as the pixels are read (the time delay will not exceed 30 nano-second). The example, using a Fuzzy Logic software, uses RLC to read DataMatrix code. This method takes 125 m sec. If we change the Fuzzy Logic method to use pixel by pixel reading from the known offset addresses which will reduce the time to approximately 40 m sec. in this example. It is noted that "m sec" refers to milli seconds. This example is based on an apparatus using an SH-2 micro-controller from Hitachi with a clock at around 27 MHz and does not include any optimization both functional and time, by module. Diagrams corresponding to this example provided in FIGS. 2(a), 3(a) and 3(b), which are described in greater detail below. FIG. 2(a) illustrates a hardware implementation of a binary processing unit 120 and a translating RLC unit 213. An example of circuit diagram of binary processing unit 120 outputting data represented with reference number 81b, and a translating RLC unit 213 is presented in FIG. 3(a), outputting data represented with reference number 81a. FIG. 3(b) illustrates a clock timing diagram for FIG. 3(b).

It is an advantage of present invention to simultaneously provide gray scale data 210, to determine the threshold value such as by using the Schmitt comparator 82 and to provide RLC 81 of the exemplary embodiment discussed in this description. In an example, I found the gray scale data, threshold value determination and RLC calculation could be all accomplished in 33.3 milli-second, during the DMA time, in the illustrated embodiment of the present invention.

As used in this description, a gray scale value is the digital value of a pixel's analog value, which can be between 0 and 255 levels for an 8 bit ADC 130. The gray scale data was obtained in this example after the analog Vout 125 of sensor 20 is sampled and hold by DSH 139. The analog signal was converted to gray scale data by passing through ADC 130. The output 50 is then connected to the ASIC or FPGA 10 to be transferred to memory 60 during the DMA sequence.

Also as used in this description, a binary value is a digital representation of a pixel's gray scale value, which can be "0" or "1" when compared to a threshold value. A binary image 219 was obtained from gray scale image data 210, after the threshold unit 214 has calculated the threshold value. A run length code (RLC) as used in this description is a representation of a succession of multiple pixels with a value of "0" or "1". In the invention described herein, memory space and processing time are reduced by overlapping the running of the RLC with reading pixel values and DMA processing.

Figure 2B:
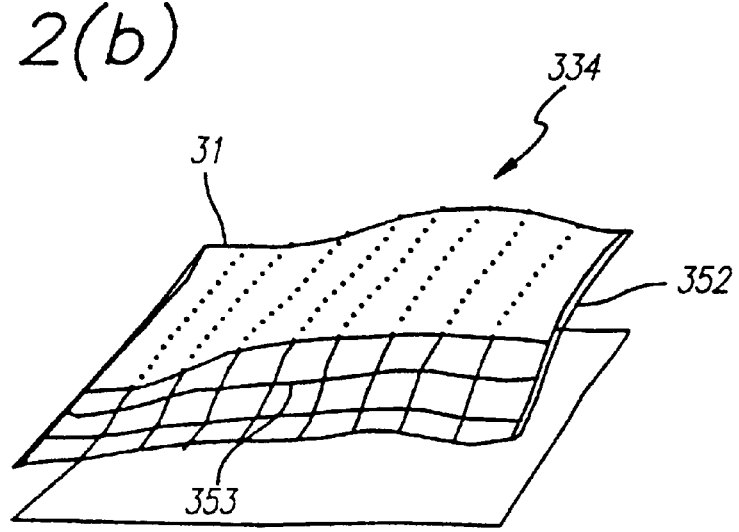
Figure 2C:
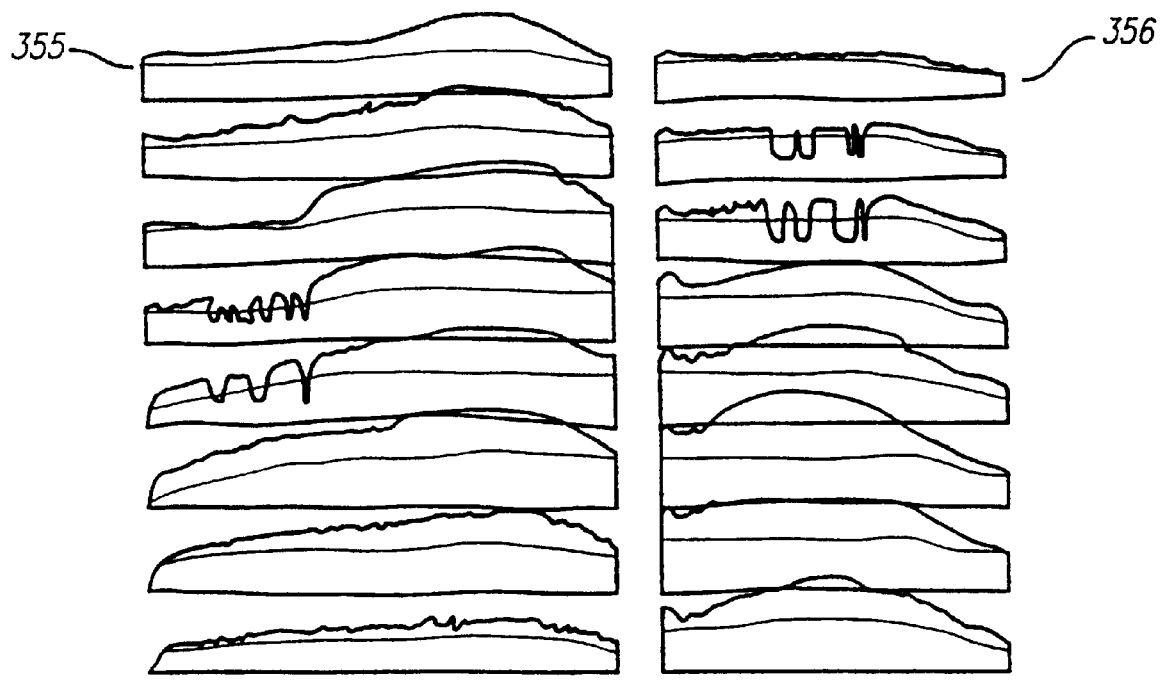

These results are achieved, for example, in the embodiment illustrated in FIG. 2(a). The analog pixel values are read from sensor 20 and after passing through DSH 139, ADC 130 are stored in memory 60. At the same time, during the DMA, the binary processing unit 120 receives the data and calculates the threshold of net-points (a non-uniform distribution of the illumination from the target 510 causes a non-even contrast and light distribution in the image data 210). Therefore the traditional real floating threshold binary algorithm, as described in the CIP Ser. No. 08/690,752, filed Aug. 1, 1996, will take a long time. To overcome this inferior distribution of the light, particularly in the hand held optical scanner 15, it is an advantage of present invention to use a floating threshold curve surface technique, such as described in *Computer Graphics*, Vol. 25, No. 4 (July 1991), ACM SIGGRAPH, Papers Chair Thomas W. Sederberg. As illustrated in FIG. 2(b), the gray scale image data 210 includes information corresponding to "n" lines, vertically 351 and horizontally 352 (i.e., 20 lines, represented by 10 rows and 10 columns). There is the same space between each two lines. Each intersection of vertical and horizontal line 353 is used for mapping the floating threshold curve surface 354. A deformable surface is made of a set of connected square elements. Square elements were chosen so that a large range of topological shape could be modeled. In these transformations the points of the threshold parameter are mapped to corners in the deformed 3-space surface. The threshold unit 214 uses the gray scale values on the line for obtaining the gray sectional curve and then it looks at the peak and valley curve of the gray section. The middle curve of the peak curve and the valley curve would be the threshold curve for this given line. As illustrated in FIG. 2(c), the average value of the vertical 355 and horizontal 356 threshold on the crossing point would be the threshold parameter for mapping the threshold curve surface. Using the above described method, the threshold unit 214 calculates the threshold of net-points for the image data 210 and store them in the memory 60 at the location 219.

After the value of the threshold is calculated for different portions of the image data 210, the binary processing unit 120 generates the binary image 219, by thresholding the gray scale image data 210. At the same time, the translating RLC unit 213 creates the RLC to be stored in memory 211.

FIG. 3(a) provides a circuit diagram or an alternative embodiment for obtaining RLC in real time. The Schmitt comparator 82 receives the signal from DSH 139 on its negative input and the Vref. 141 representing a portion of the signal which represents the illumination value of the target 510, captured by illumination sensor 138, on its positive output. Vref. 141 would be representative of the target illumination, which depends on the distance of the imager 15 from the target 510. Each pixel value is compared with the threshold value and will result to a "0" or "1" compared to a variable threshold value which is the average target illumination. The counter 135 will count (it will increment its value at each CCD pixel clock 137) and transfer to the latch 136, each total number of pixel, representing "0" or "1" to the ASIC 10 at the DMA sequence instead of "0" or "1" for each pixel. FIG. 3(*b*) is the timing diagram representation of circuitry illustrated in FIG. 3(*a*).

By way of further description, the present invention simultaneously provides gray scale data 210, to determine the threshold value by using the Schmitt comparator 82 and to provide RLC 81. In one example, the measured time by doing the experimentation verified that the gray scale data, threshold value determination and RLC calculation could be all accomplished in 33.3 milli-second, during the DMA time.

A gray scale value is the digital value of a pixel's analog value, which can be between 0 and 255 levels for an 8 bit ADC 130. The gray scale data is obtained after the analog $V_{out}$ 125 of sensor 20 is sampled and held by DSH 139 (double sample and hold device). The analog signal is converted to gray scale data by passing through ADC 130. The output 50 is then connected to the ASIC or FPGA 10 to be transferred to memory 60 during the DMA sequence.

A binary value is the digital representation of a pixel's gray scale value, which can be "0" or "1" when compared to a threshold value. A binary image 219 can be obtained from the gray scale image data 210, after the threshold unit 214 has calculated the threshold value.

A run length code (RLC) can be a representation of a succession of multiple (X) number of pixels with a value of "0" or "1". It is easily understandable that memory space and processing time can be considerably optimized if RLC can take place at the same time that pixel values are read and DMA is taking place. FIG. 2(*a*) represents an alternative for the binary processing and RLC translating units for a high speed optical scanner 15. The analog pixel values are read from sensor 20 and after passing through DSH 139, ADC 130 are stored in memory 60. At the same time, during the DMA, the binary processing unit 120 receives the data and calculates the threshold of net-points (a non-uniform distribution of the illumination from the target 510, causes a non-even contrast and light distribution represented in the image data 210. Therefore the traditional real floating threshold binary algorithm, as described in the CIP Ser. No. 08/690,752, filed Aug. 1, 1996, will take a long time. To overcome this poor distribution, of the light, particularly in a hand held optical scanner or imaging device., it is an advantage of present invention to use a floating threshold curve surface technique, as is known in the art. The gray scale image data 210 includes data representing "n" scan lines, vertically 351 and "m" scan lines horizontally 352 (for example, 20 lines, represented by 10 rows and 10 columns). There is the same space between each two lines. Each intersection of vertical and horizontal line 353 is used for mapping the floating threshold curve surface 354. A deformable surface is made of a set of connected square elements. Square elements were chosen so that a large range of topological shape could be modeled. In these transformations the points of the threshold parameter are mapped to corners in the deformed 3-space surface. The threshold unit 214 uses the gray scale values on the line for obtaining the gray sectional curve and then it looks at the peak and valley curve of the gray section. The middle curve of the peak curve and the valley curve would be the threshold curve for this given line. The average value of the vertical 355 and horizontal 356 threshold on the crossing point would be the threshold parameter for mapping the threshold curve surface. Using the above described method, the threshold unit 214 calculates the threshold of net-points for the image data 210 and store them in the memory 60 at the location 219).

After the value of the threshold is calculated for different portion of the image data 210, the binary processing unit 120 generates the binary image 219, by thresholding the gray scale image data 210. At the same time, the translating RLC unit 213 creates the RLC to be stored in location 211.

FIG. 3(*a*) represents an alternative for obtaining RLC in real time. The Schmitt comparator 82 receives the signal from DSH 139 on its negative input and the Vref. 141 representing a portion of the signal which represents the illumination value of the target 510, captured by illumination sensor 138, on its positive output. Vref. 141 would be representative of the target illumination, which depends on the distance of the optical scanner 15 from the target 510. Each pixel value is compared with the threshold value and will result to a "0" or "1" compared to a variable threshold value which is the average target illumination. The counter 135 will count (it will increment its value at each CCD pixel clock 137) and transfer to the latch 136, each total number of pixel, representing "0" or "1" to the ASIC 10 at the DMA sequence instead of "0" or "1" for each pixel. FIG. 3(*b*) is the timing diagram representation of circuitry defined in FIG. 3(*a*).

Gray Scale Image Processing

The Depth of Field (DOF) Chart of an optical scanner 15 is defined by a focused image at the distances where a minimum of less than one (1) to three (3) pixels is obtained for a Minimum Element Width (MEW) for a given dot used to print the symbology, where the difference between a black and a white is at least 50 points in a gray scale. The sub-pixel interpolation technique allows the decode of a MEW down to less than one (1) pixel instead of 2 to 3 pixels, providing a perception of "Extended DOF". This method is described below to obtain an orientation free reading capabilities by the Image Grabber.

An example of operation of the present invention is illustrated in FIGS. 8(*e*) and 8(*f*). As illustrated there, as a portion of the data from the CCD 20 is read, the system looks for a series of coherent bars and spaces, as illustrated with step 220. The system then identifies text and/or other type of data in the image data 210, as illustrated with step 221. The system then determines an area of interest, containing meaningful data, in step 230. In step 240, the system determines the angle of the symbology using a checker pattern technique or a chain code technique, such as for example finding the slope or the orientation of the symbology 27, 28, 29 within the target 510. The system then uses a sub-pixel interpolation technique to reconstruct the optical code 381 or symbology code 381 in step 250. In exemplary step 260 a decoding routine is then run.

It is important to note that at all time, data inside of the Checker Pattern Windows 380 are conserved to be used to identify other 2D symbologies or text if needed.

The Interpolation Technique uses the projection of an angled bar 381 or space by moving x number of pixels up or down to determine the module value corresponding to the minimum element width (MEW) and to compensate for the convolution distortion as represented by reference number 382. This method allows to reduce the MEW of pixels to less than 1.0 pixel for the decode algorithm versus 2 to 3 normally required.

Illumination

An exemplary optical scanner 15 incorporates target illumination device 72 operating within visible spectrum. In a preferred embodiment, the illumination device includes plural LEDs (light emitting diodes). Each LED preferably has a peak luminous intensity of i.e., 6.5 lumens/steradian (for a HLMT-CL00) with a total field angle of 8 degrees, although any suitable level of illumination may be selected. In the preferred embodiment, three LEDs are placed on both sides of the lens barrel and are oriented one on top of the other such that the total height is approximately 15 mm. Each set of LEDs is disposed with a holographic optical element which serves to homogenize the beam and to illuminate a target area corresponding to the wide field of view.

Figure 4:
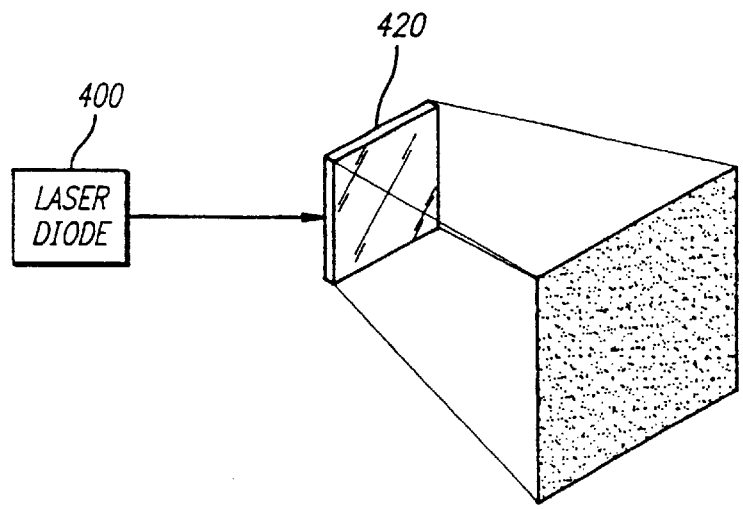
FIG. 4 illustrates a laser light illumination pattern and apparatus, using a holographic diffuser, in accordance with the present invention.

FIG. 4 indicates an alternative illumination system to illuminate the target 510. Any suitable light source 410 can be used, including a flash light (strobe), halogen light (with collector/diffuser on the back) or a battery of LEDs mounted around the lens system (with or without collector/diffuser on the back or diffuser on the front) making it more suitable because of the MTBF of the LEDs. A laser diode spot 400 also can be used combined with a holographic diffuser to illuminate the target area called the Field Of View. Briefly, the holographic diffuser 420 receives and projects the laser light according to the predetermined holographic pattern angles in both X and Y direction toward the target as indicated by FIG. 4).

Frame Locator

Figure 6:
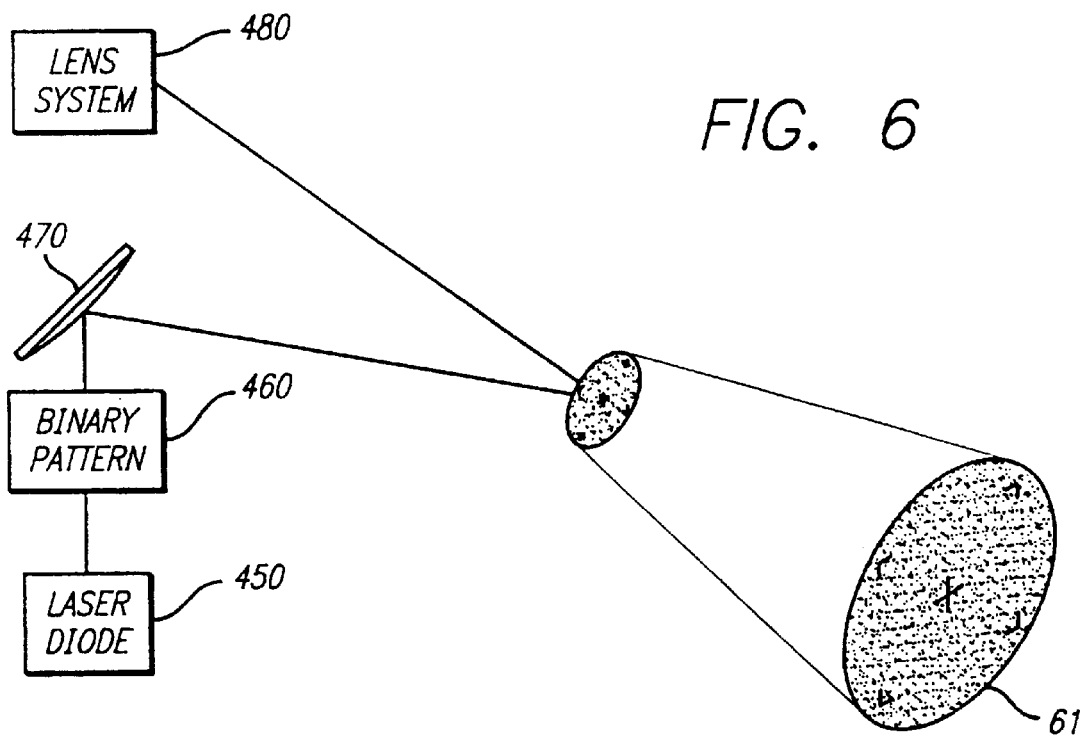
FIG. 6 is a diagram illustrating an alternative apparatus for framing a target in accordance with the present invention.

FIG. 6 illustrates an example of an alternative apparatus to frame the target. The Frame locator can be any Binary optics with pattern or Grading. The first order beam can be preserved to indicate the center of the target, generating the pattern 61 indicating four corners and the center of the aimed area as shown in FIG. 6. Each beamlet is passing through a binary pattern providing "L" shape image, to locate each corner of the field of view and the first order beam was locating the center of the target. A laser diode 450 provides light to the binary optics 460. A mirror 470 may be used to direct the light, or alternatively a mirror is not used. Lens system 480 is provided as needed.

Figure 5:
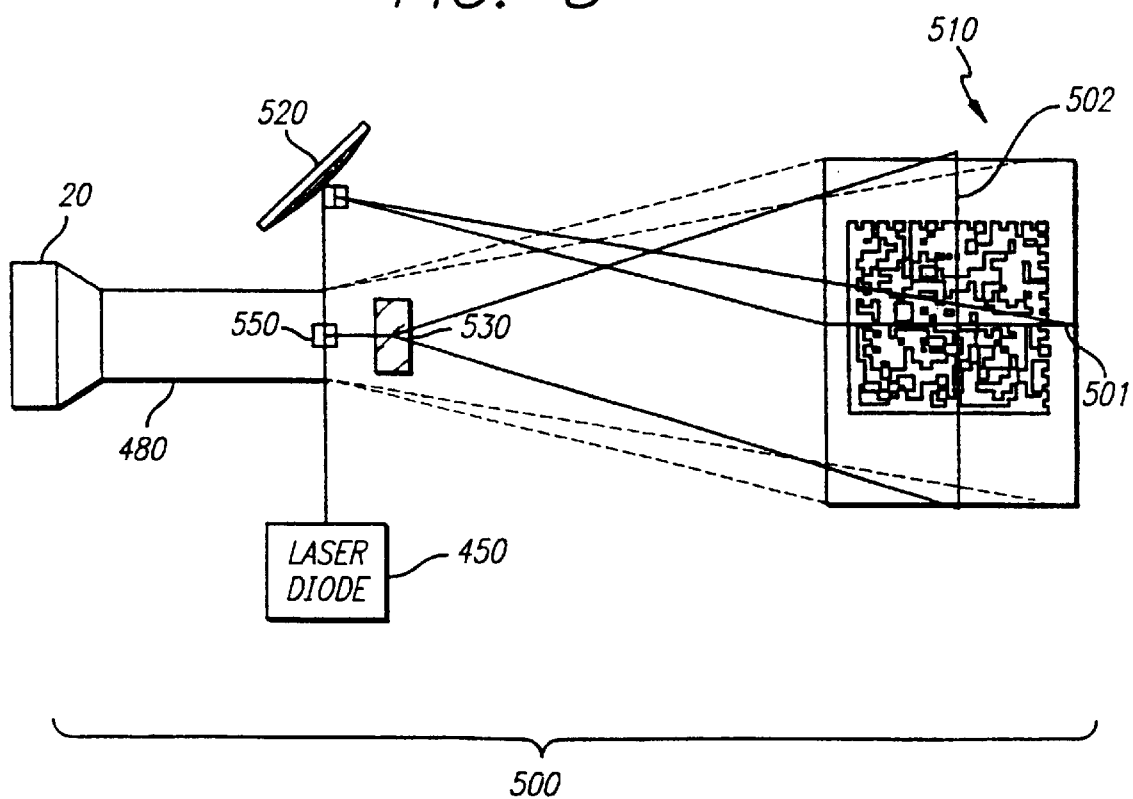
FIG. 5 illustrates a framing locator mechanism utilizing a beam splitter and a mirror or diffractive optical element that produces two spots in accordance with the present invention.

In an alternative example as shown in FIG. 5, the framing locator mechanism 500 utilizes a beam Splitter 550 and a mirror 520 or diffractive optical element that produces two spots. Each spot will produce a line after passing through the holographic diffuser 530 with an spread of 1°×30° along the X and/or Y axis, generating either a horizontal line 501 or a crossing line 502 across the filed of view, indicating clearly the field of view of the zoom lens. The diffractive optic is disposed along with a set of louvers or blockers which serve to suppress one set of two spots such that only one set of two spots is presented to the operator.

Figure 7A:
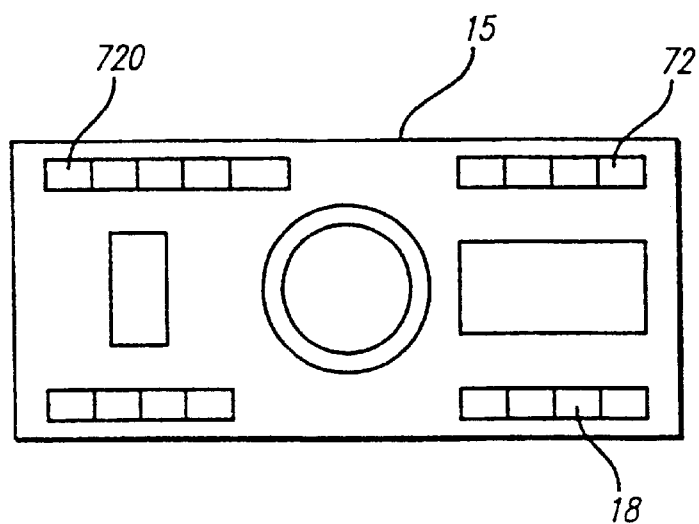
FIG. 7a illustrates an embodiment of an imaging apparatus in accordance with the present invention.
Figure 7B:
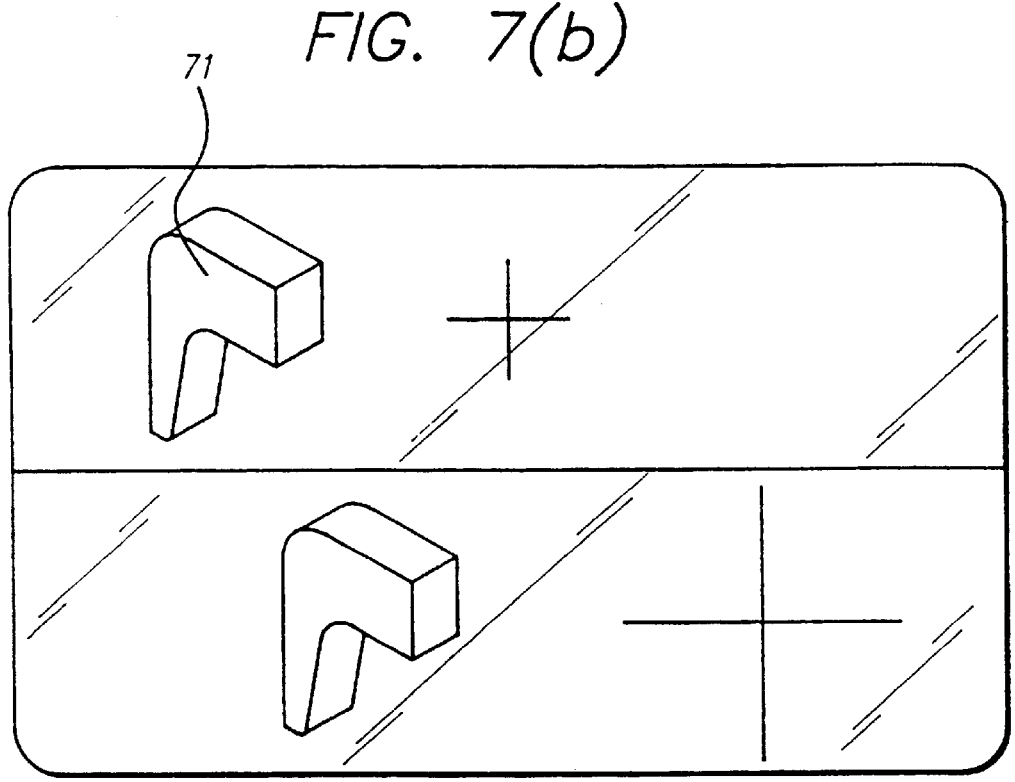
FIG. 7b illustrates a generated pattern of a frame locator in accordance with the present invention.

Another example is illustrated in FIG. 7(a). We could also cross the two parallel narrow sheets of light in different combinations Parallel on X or Y axis and centered, left or right positioned crossing lines when projected toward the target, illustrated by patterns 73a and 73b in FIG. 7(b).

Thus, it is seen that an optical scanner/image reader for reading images and decoding optical information or code, including one and two dimensional symbologies at variable depth of field, including memory and image processing for high speed applications is provided. One skilled in the art will appreciate that the present invention can be practiced by other than the preferred embodiments which are presented in this description for purposes of illustration and not of limitation, and the present invention is limited only by the claims which follow. It is noted that equivalents for the particular embodiments discussed in this description may practice the invention as well.

What is claimed is:

1. An optical reading apparatus for reading image information selected from a group consisting of optical codes, one-dimensional symbologies, two-dimensional symbologies and three-dimensional symbologies, said image information being contained within a target image field, said optical reading apparatus comprising:

a light source projecting light onto said target image field;

an optical assembly comprising at least one lens, said optical assembly focusing said light reflected from said target field;

a sensor, said sensor including a plurality of pixel elements for sensing an illumination level of said focused reflected light;

an optical processor generating an electrical signal proportional to said illumination level received from said sensor and converting said electrical signal into output data, said output data describing at least one value for each pixel element;

a memory receiving and storing the output data, the stored output data indicative of the target image field;

an image processor receiving a portion of the output data and generating distinguishing data from an identified area of interest; and a data processing unit coupled with said memory and responsive to the distinguishing data, the data processing unit including processing circuits processing the stored data to produce decoded data representing said image information.

2. The apparatus of claim 1 wherein said sensor, and said optical processor are integrated onto a single chip.

3. The apparatus of claim 1 wherein said sensor, said optical processor and said image processor are integrated onto a single chip.

4. The combination of claim 1 wherein said sensor, said optical processor and said image processor are integrated onto a single chip.

5. The apparatus of claim 1 wherein said sensor, said optical processor, said image processor and said data processing unit are integrated onto a single chip.

6. The apparatus of claim 1 further comprising a frame locator means for directing said sensor to an area of interest in said target image field.

7. The apparatus of claim 1 further comprising a camera and a digital imaging means.

8. The apparatus of claim 1 further comprising a view finder including an image display.

9. The apparatus of claim 1 wherein said optical assembly includes a fixed focused lens assembly.

10. The apparatus of claim 1 wherein said optical assembly includes digital zoom function means.

11. The apparatus of claim 1 wherein said data processing unit further comprises an integrated function means for high speed and low power digital imaging.

12. The apparatus of claim 1 wherein said optical assembly further comprises an image processing means having auto-zoom and auto-focus means controlled by said data processing unit for determining an area of interest at any distance, using high frequency transition between black and white.

13. The apparatus of claim 1 wherein said data processing unit further comprises a pattern recognition means for global feature determination.

14. The apparatus of claim 1 further comprising an image processing means using gray scale and color processing, said processing associated with a form factor.

15. The apparatus of claim 1 further comprising means for auto-discriminating between a camera function and an optical code recognition function and means for implementing a decoding function to read encoded data within the optical image.

16. The apparatus of claim 1 further comprising an aperture and means for reading optical codes bigger than the physical size of the aperture.

17. The apparatus of claim 1 wherein said sensor is selected from a group consisting of a CCD, CMOS sensor or CMD.

18. The apparatus of claim 1 wherein said light source is selected from a group consisting of a light emitting diode, strobe, laser diode or halogen light.

19. The apparatus of claim 1 wherein the optical processor includes a sample and hold circuit.

20. The apparatus of claim 1 wherein the optical processor includes an analog to digital converter circuit.

21. The apparatus of claim 1 wherein the optical processor includes a sample and hold circuit and an analog to digital converter circuit.

22. The apparatus of claim 1 wherein said image processor includes an ASIC.

23. The apparatus of claim 1 wherein said image processor includes an FPGA.

24. The apparatus of claim 1 wherein said image processor includes a binary processor and a gray scale processor.

25. The apparatus of claim 1 wherein said image processor includes a binary processor in series with a run length code processor.

26. The apparatus of claim 25 wherein said run length code processor outputs indicator data.

27. The apparatus of claim 1 wherein said image processor includes a gray scale processor.

28. The optical reading apparatus according to claim 1 wherein at least a portion of the output data is compressed and stored, and the image processor processes compressed data.

29. The optical reading apparatus according to claim 28 wherein a least a portion of the compressed data is received and stored before the memory receives and stores the sensed illumination level for all pixel elements.

30. The optical reading apparatus according to claim 28 wherein the compression includes binarization.

31. The optical reading apparatus according to claim 28 wherein the compression includes run-length coding.

32. The optical reading apparatus according to claim 1 wherein the distinguishing data is generated before the memory receives and stores the output data indicative of all pixel elements.

33. The optical reading apparatus according to claim 1 wherein the image processor includes means for processing the portion of the output data to identify an area of interest as indicative of a type of optical code.

34. The optical reading apparatus according to claim 1 wherein the image processor includes means for performing sub-pixel interpolation.

35. The optical reading apparatus according to claim 1 wherein the image processor includes means for determining an angle that the symbologies make with the orientation of the sensor.

36. The apparatus of claim 1 wherein said sensor, said optical processing means and said image processor are each implemented on discrete chips.

37. The apparatus of claim 1 wherein the values represent gray scale values.

38. The apparatus of claim 1 wherein the values represent color values.

39. An optical reading apparatus for reading image information selected from a group consisting of optical codes, one-dimensional symbologies, two-dimensional symbologies and three-dimensional symbologies, said image information being contained within a target image field, said optical reading apparatus comprising:

a light source means for projecting an incident beam of light onto said target image field;

an optical assembly means for focusing said light reflected from said target field;

a sensor means for sensing an illumination level of said focused reflected light;

an optical processing means for generating an electrical signal proportional to said illumination levels received from said sensor and for converting said electrical signal into output data, said output data describing at least one value for each pixel element;

a memory means for receiving and storing the output data;

an image processor means for receiving a portion of the output data and generating distinguishing data from an identified area of interest; and a data processing unit means coupled with said memory for processing the output data to produce decoded data representing said image information, the data processing unit being responsive to the distinguishing data.

40. A method for reading image information selected from a group consisting of optical codes, one-dimensional symbologies, two-dimensional symbologies and three-dimensional symbologies, said image information being contained within a target image field, said method comprising:

projecting light onto said target image field;

focusing said light reflected from said target field;

sensing an illumination level of said focused reflected light;

generating an electrical signal proportional to said illumination levels received from said sensor and converting said electrical signal into output data, said output data describing at least one value for each pixel element;

storing the output data the stored output data indicative of the target image field;

locating an area of interest in a portion of the output data;

processing data indicative of the area of interest to generate distinguishing data;

selecting responsive to the distinguishing data, a decoding process; and processing using the selected decoding process the stored output data to produce decoded data representing said image information.

41. A method for processing image data corresponding to a physical image selected from a group consisting of optical codes, one-dimensional symbologies, two-dimensional symbologies and three-dimensional symbologies, said method using an optical reading apparatus having a focal plane, said method comprising:

searching for a series of coherent bars and spaces in said image data;

identifying textual data;

determining a subset of said data containing meaningful data;

determining an angle of said physical image with respect to said focal plane; and performing sub-pixel interpolation to generate output data corresponding to said physical image.

42. The method of claim 41 wherein said step of determining an angle uses a checker pattern technique for determining said angle.

43. The method of claim 41 wherein said step of determining an angle uses a chain code technique for determining said angle.

44. An optical reading apparatus for reading image information contained within a target image field, the optical reading apparatus comprising:

a light source for projecting light onto the target image field;

an optical assembly directing the light reflected from the target image field to an optical path;

a sensor within the optical path, the sensor including a plurality of pixel elements for sensing the focused reflected light;

an optical processing means for processing the sensed target image into output data, the output data indicative of the sensed light for each of the pixel elements;

a first processing means for processing at least a portion of the output data to generate a first representation of the target image;

a second processing means for processing the output data to generate a second representation of the target image; and wherein the second processing means uses the first representation to decode the target image.

45. The apparatus of claim 44 wherein the sensor and the optical processing means are integrated onto a single chip.

46. The apparatus of claim 44 wherein the sensor, the optical processing means and the first and second processing means are integrated onto a single chip.

47. The apparatus of claim 44 further comprising a frame locator means for directing the sensor to an area of interest in the target image field.

48. The apparatus of claim 44 further comprising a camera or a digital imaging means.

49. The apparatus of claim 44 further comprising a view finder including an image display.

50. The apparatus of claim 44 wherein the optical assembly includes a fixed focus lens assembly.

51. The apparatus of claim 50 wherein the lens assembly is part of the sensor packaging.

52. The apparatus of claim 44 wherein the optical assembly includes digital zoom function means.

53. The apparatus of claim 44 wherein the first processing means further comprises an integrated function means for high speed and low power digital imaging.

54. The apparatus of claim 44 wherein the optical assembly further comprises an image processing means having auto-zoom and auto-focus means controlled by the first processing means for determining an area of interest at any distance, using high frequency transition between black and white.

55. The apparatus of claim 44 wherein the first processing means further comprises pattern recognition means for global feature determination.

56. The apparatus of claim 44 further comprising an image processing means using gray scale, color, and/or shade processing, said image processing associated with a form factor.

57. The apparatus of claim 44 further comprising means for auto-discriminating between a camera function and an optical code recognition function and means for implementing a decoding function to read encoded data within an optical image.

58. The apparatus of claim 44 further comprising an aperture and means for reading optical codes bigger than the physical size of the aperture.

59. The apparatus of claim 44 wherein the sensor is selected from a group consisting of a CCD, CMOS sensor, or CMD.

60. The apparatus of claim 44 wherein the light source is selected from a group consisting of a light emitting diode, strobe, laser diode, or halogen light.

61. The apparatus of claim 44 wherein the optical processing means includes a sample and hold circuit.

62. The apparatus of claim 44 wherein the optical processing means includes a sample and hold circuit and an analog to digital converter circuit.

63. The apparatus of claim 44 wherein the first processing means includes an ASIC.

64. The apparatus of claim 44 wherein the first processing means includes an FPGA.

65. The apparatus of claim 44 wherein the first processing means includes a binary processor and a gray scale processor.

66. The apparatus of claim 42 wherein the first processing means includes a binary processor in series with a run length code processor.

67. The apparatus of claim 66 wherein the run length code processor outputs indicator data.

68. The apparatus of claim 44 wherein the first processing means includes a gray scale processor.

69. The apparatus of claim 44 wherein the first processing means provides the first representation of the target image prior to all the pixel elements being processed into output data by the optical processing means.

70. The apparatus of claim 44 wherein the first representation of the target image data is a binary representation.

71. The apparatus of claim 44 wherein the first representation of target image data is a run length coded representation.

72. The apparatus of claim 44 wherein the first representation of target image data is used to identify areas of interest in the target image.

73. The apparatus of claim 44 wherein the first processing means further includes means for determining an angle that the symbologies make with the orientation of the sensor.

74. The apparatus of claim 44 wherein the first processing means further includes means for identifying the type of optical code used for said symbologies.

75. The apparatus of claim 44 wherein the first processing means further includes means for performing sub-pixel interpolation.

76. The apparatus of claim 75 wherein the processing means uses the result of the sub-pixel interpolation to extract coded information from the symbologies.

77. The apparatus of claim 44 wherein the second processing means uses the first representation of the target image to extract coded information from said symbologies.

78. The apparatus of claim 44 wherein the second processing means uses gray scale data to extract coded information from the symbologies.

79. The apparatus of claim 44 wherein the sensor and the optical processing means are each implemented on discrete chips.

80. The apparatus of claim 44 wherein the sensor, the optical processing means and the first and second processing means are each implemented on discrete chips.

81. A method for reading image information contained within a target image field, said method comprising:

projecting light onto the target image field;

directing the light reflected from the target image field to an optical path;

sensing the reflected light in the optical path;

processing the sensed light into output data, the output data indicative of the sensed light for each pixel element corresponding to discrete points within the target image field;

processing at least a portion of the output data to generate a first representation of at least a portion of the target image field;

selecting, responsive to the first representation, a decoding process; and decoding the output data, using the selected decoding process, to generate data indicative of the image information.

82. A method for processing image data corresponding to a physical image selected from a group consisting of optical codes, one-dimensional symbologies, two-dimensional symbologies, and three-dimensional symbologies, the method using an optical reading apparatus having a focal plane, the method comprising:

searching for a series of coherent bars and spaces in the image data;

identifying textual data;

determining a subset of the data containing meaningful data;

determining an angle of the physical image with respect to the orientation of the optical reading apparatus; and performing sub-pixel interpolation to generate output data corresponding to the physical image.

83. The method of claim 82 wherein the step of determining an angle uses a checker pattern technique for determining the angle.

84. The method of claim 82 wherein the step of determining an angle uses a chain code technique for determining the angle.

* * * * *